(12) United States Patent
Francisco et al.

(10) Patent No.: US 8,142,663 B2
(45) Date of Patent: Mar. 27, 2012

(54) LOW PRESSURE PRODUCTION OF DRINKING WATER

(75) Inventors: Michael H. Francisco, Menlo Park, CA (US); Subhash Mehra, Mumbai (IN); Sumeet Mehra, Mumbai (IN)

(73) Assignee: Acuity/Sparkle, Ltd., Grand Cayman (KY)

( * ) Notice: Subject to any disclaimer, the term of this patent is extended or adjusted under 35 U.S.C. 154(b) by 1018 days.

(21) Appl. No.: 11/941,713

(22) Filed: Nov. 16, 2007

(65) Prior Publication Data

US 2008/0203025 A1    Aug. 28, 2008

Related U.S. Application Data

(60) Provisional application No. 60/859,876, filed on Nov. 16, 2006.

(51) Int. Cl.
*B01D 61/02* (2006.01)
*B01D 35/26* (2006.01)
*C02F 1/44* (2006.01)
*B01D 61/00* (2006.01)

(52) U.S. Cl. .......... 210/652; 210/641; 210/137; 210/90; 210/650

(58) Field of Classification Search .......... None
See application file for complete search history.

(56) References Cited

U.S. PATENT DOCUMENTS

| | | | |
|---|---|---|---|
| 4,000,065 A * | 12/1976 | Ladha et al. ............ 210/652 |
| RE33,135 E | 12/1989 | Wann | |
| 5,725,777 A | 3/1998 | Taylor | |
| 6,190,556 B1 | 2/2001 | Uhlinger | |
| 6,338,803 B1 | 1/2002 | Campbell et al. | |
| 6,562,241 B1 | 5/2003 | Gritton et al. | |
| 6,589,423 B1 | 7/2003 | Chancellor | |
| 2002/0023865 A1 | 2/2002 | Northcut | |
| 2004/0178145 A1 | 9/2004 | Herrington et al. | |
| 2005/0242041 A1 | 11/2005 | Cumberland | |
| 2006/0113251 A1 | 6/2006 | McGuire et al. | |

FOREIGN PATENT DOCUMENTS

DE    80 07 914 U1    1/1981

* cited by examiner

*Primary Examiner* — Nam Nguyen
*Assistant Examiner* — Madeline Gonzalez
(74) *Attorney, Agent, or Firm* — Schneck & Schneck

(57) ABSTRACT

An apparatus and methods for producing purified drinking water are disclosed. A hand pump is used in a closed system to generate pressure sufficient to pass the untreated water through a system of filters and a reverse osmosis membrane. The system preferably includes an ultrafiltration filter. The resulting water is substantially pure, being free of bacteria and having a significant amount of minerals and salts removed to make it safe for drinking. The system can produce enough potable water to supply the daily needs for a small village.

13 Claims, 2 Drawing Sheets

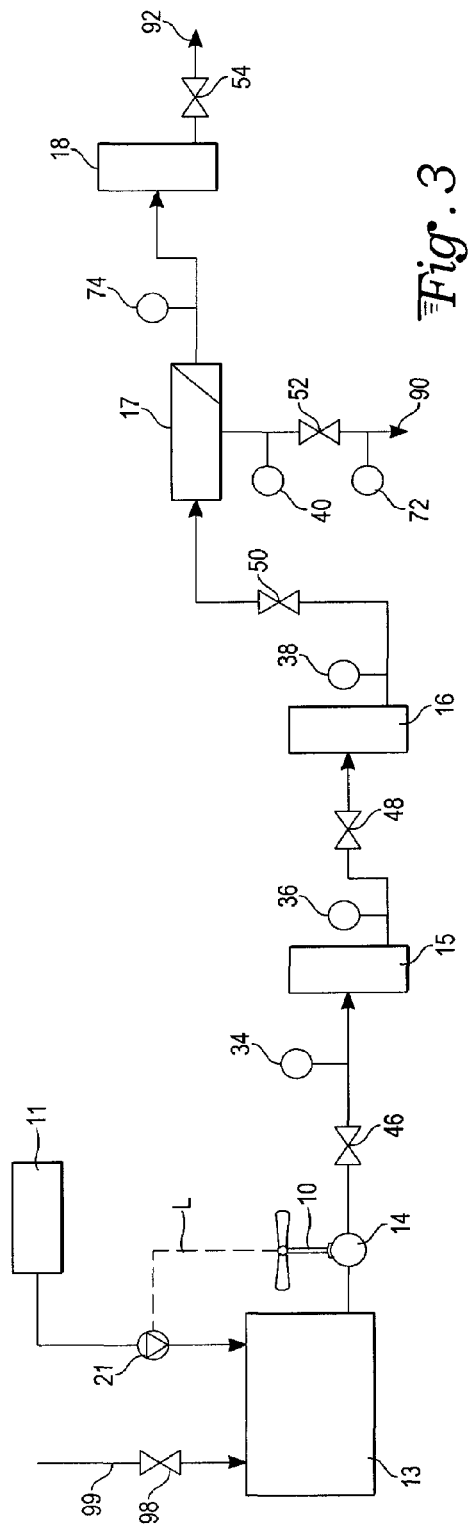
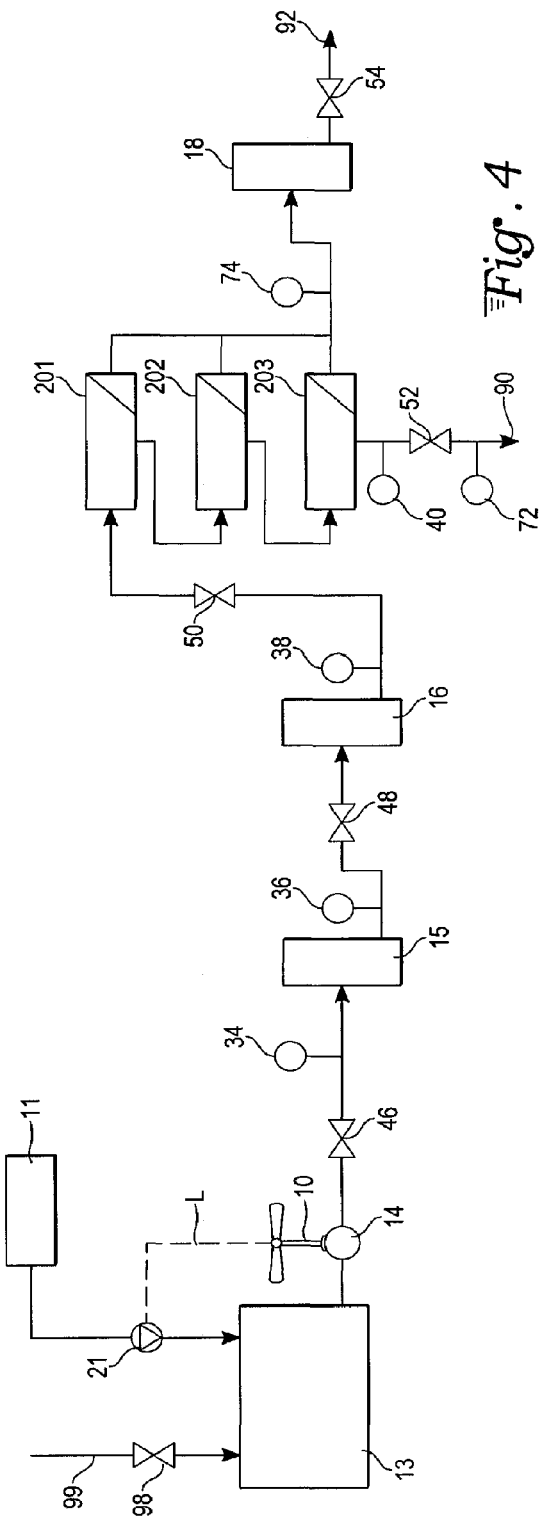

LOW PRESSURE PRODUCTION OF DRINKING WATER

CROSS-REFERENCE TO RELATED APPLICATION

This application claims priority from U.S. provisional application No. 60/859,876, filed Nov. 16, 2006.

TECHNICAL FIELD

The present invention relates to an apparatus and methods for producing purified drinking water.

BACKGROUND OF THE INVENTION

Potable (i.e., drinking) water is a necessity to which millions of people throughout the world have limited access. Water is often seen as the most basic and accessible element of life, and seemingly the most plentiful. For every gallon in rivers or lakes, fifty more lie buried in vast aquifers beneath the surface of the earth. There is no standard for how much water a person needs each day, but experts usually put the minimum at 100 liters for adults. Most people drink two or three liters. The rest is typically used for cooking, bathing, and sanitation. Adult Americans consume between four hundred and six hundred liters of water each day.

By 2050, there will be at least nine billion people on the planet, the great majority of them in developing countries. If water were spread evenly across the globe, there might be enough for everyone. But rain often falls in the least desirable places at the most disadvantageous times. For example, some cities in India get fewer than forty days of rain each year—all in less than four months. Somehow, though, the country has to sustain nearly twenty percent of the Earth's population with four percent of its water. China has less water than Canada—and forty times as many people. With wells draining aquifers far faster than they can be replenished by rain, the water table beneath Beijing has fallen nearly two hundred feet in the past twenty years.

More than a billion people lack access to drinking water. Simply providing access to clean water could save two million lives each year. Nearly two billion people rely on wells for their water. There were two million wells in India thirty years ago; today, there are twenty-three million. As the population grows, the freshwater available to each resident dwindles, and people have no choice but to dig deeper. Drill too deep, though, and saltwater and arsenic can begin to seep in.

As cities have grown, many rivers have become unfit to provide untreated water. The amount of fecal bacteria in the Yamuna River, the principal source of water for New Delhi, has increased thousands of times over the past decade. Even in the most prosperous neighborhoods of cities like Delhi and Mumbai, water is available for just a few hours each day—and often is contaminated. India's situation is extreme, but other countries have had similar problems.

Water purification processes are well known and used throughout the world. Water purification is the removal of contaminants from untreated water to produce drinking water that is pure enough for human consumption. Substances that are removed during the process include parasites (such as *Giardia* or *Cryptosporidium*), bacteria, algae, viruses, fungi, minerals (including toxic metals such as lead, copper and arsenic), and man-made chemical pollutants. Schistos omiasis causes anemia or organ infection in humans due to parasitic flukes transmitted through feces-contaminated water. This disease causes much suffering in third world countries. Many such contaminants can be dangerous. Other contaminants are removed to improve the water's smell, taste, and appearance.

It is not possible to tell whether water is safe to drink just by looking at it. Simple procedures such as boiling or the use of a household charcoal filter are not sufficient for treating water from an unknown source. Even natural spring water—considered safe for all practical purposes in the 1800s—must now be tested before determining what kind of treatment is needed. Brackish water is water that has up to 2000-5000 ppm (parts per million) total dissolved solids (TDS). "Mildly" brackish water has a TDS of about 5001000 ppm.

Acceptable drinking water specifications (IS:10500-1191) include the following recommended and "acceptable" levels: a TDS of 500 ppm (up to 2000 ppm, if no other source is available); 0.3 ppm iron (up to 1.0 ppm); 1.0 ppm fluoride (up to 1.5 ppm); 0.05 ppm arsenic; 0.03 ppm aluminum (up to 0.2 ppm); with a pH of 6.5-8.5.

There are many potential sources of water, though none is safe for drinking without prior treatment and purification. The water emerging from some deep groundwater may have fallen as rain many decades or even hundreds of years ago. Soil and rock layers naturally filter the groundwater to a high degree of clarity before it is pumped to the treatment plant. Such water may emerge as springs, artesian springs, or may be extracted from boreholes or wells. Deep groundwater is generally of very high bacteriological quality (i.e., a low concentration of pathogenic bacteria such as *Campylobacter* or the pathogenic protozoa *Cryptosporidium* and *Giardia*) but may be rich in dissolved solids, especially carbonates and sulphates of calcium and magnesium. Depending on the strata through which the water has flowed, other ions may also be present including chloride, and bi-carbonate. There may be a requirement to reduce the iron or manganese content of this water to make it pleasant for drinking and cooking. Disinfection is also required. Where groundwater recharge is practiced, it is equivalent to lowland surface waters for treatment purposes.

Water emerging from shallow groundwater is usually taken from wells or boreholes. The bacteriological quality can be variable depending on the source. A variety of soluble materials may be present including potentially toxic metals such as zinc and copper. Arsenic contamination of groundwater is a serious problem in some areas, notably from shallow wells in Bangladesh and West Bengal in the Ganges Delta. Fluoride is also a potentially dangerous contaminant, potentially leading lead to fluorosis—a serious bone disease.

Typically located in the headwaters of river systems, upland reservoirs are usually sited above any human habitation and may be surrounded by a protective zone to restrict the opportunities for contamination. Bacteria and pathogen levels are usually low, but some bacteria, protozoa or algae will be present. Many upland sources have low pH, which must be adjusted.

Low land surface waters, such as rivers, canals and low land reservoirs, will have a significant bacterial load and may also contain algae, suspended solids and a variety of dissolved constituents. Surface water is contaminated with biological and chemical pollutants and may potentially transmit diseases such as diarrhea, dysentery, typhoid, cholera and hepatitis. It should never be used for drinking without treatment and/or disinfection.

Many processes are available for purification of water, with their use depending on the particular contaminants present in the water. Ultrafiltration membranes are a relatively new development; they use a polymer film with chemically formed microscopic pores that can be used in place of granular media to filter water effectively without coagulants. The type of membrane media determines how much pressure is needed to drive the water through and what sizes of microorganisms can be filtered out. In ultrafiltration, hydrostatic pressure forces a liquid against a semipermeable membrane. Suspended solids and solutes of high molecular weight are retained up to about 0.01 microns in size. This removes bacteria and many viruses, but not salts (ions), while water and low molecular weight solutes pass through the membrane.

Reverse osmosis is the process of pushing a solution through a filter that traps the solute on one side of a reverse osmosis membrane and allows the pure solvent to be obtained from the other side of the membrane. More formally, it is the process of forcing a solvent from a region of high solute concentration through a membrane to a region of low solute concentration by applying a pressure in excess of the osmotic pressure. This is the reverse of the normal osmosis process, which is the natural movement of solvent from an area of low solute concentration, through a membrane, to an area of high solute concentration when no external pressure is applied. A reverse osmosis membrane is semipermeable, meaning it allows the passage of solvent but not of solute, down to a particle size of about 0.0005 microns, which is sufficient to remove viruses and salts (ions).

The membranes used for reverse osmosis have no pores; rather, the separation takes place in a dense polymer layer of only microscopic thickness. In most cases the membrane is designed to allow only water to pass through. The water goes into solution in the polymer of which the membrane is manufactured, and crosses it by diffusion. This process normally requires that a high pressure be exerted on the high concentration side of the membrane, usually 4 to 14 bar (60 to 200 pounds per square inch) for fresh and brackish water, and 40 to 70 bar (600 to 1000 psi) for seawater, which has around 24 bar (350 psi) natural osmotic pressure which must be overcome.

Reverse osmosis membranes are designed to remove dissolved salts from water. While water passes readily through the reverse osmosis membrane, dissolved salt passes through very slowly. Under natural conditions of osmosis, water will diffuse through a semipermeable membrane toward a region of higher salt concentration in order to equalize solution strength on both sides of the membrane. In order to overcome and reverse this osmotic tendency, pressure is applied to feedwater, thereby producing a purified stream.

Salt rejection is a measure of how well a membrane element rejects the passage of dissolved ions. Although a reverse osmosis element may be called upon to reject many different ions, sodium chloride (NaCl) is used as a measurement standard. With few exceptions, reverse osmosis membranes reject divalent ions better than monovalent ions such as sodium and chloride. This NaCl (salt) rejection has been universally accepted as the standard for measuring a membrane element's ionic rejection performance.

Reverse osmosis membranes are also called upon to remove, or at least tolerate, other impurities in feedwater, including organics, silica, and gases. The reverse osmosis process is best known for its use in desalination (removing the salt from sea water to get fresh water) and has been used in this way since the early 1970s.

U.S. standards generally allow reverse osmosis-purified water to be used for drinking. In Europe, however, because leaks or breaks in the filters are possible, thus allowing potential escape of pathogens, water from reverse osmosis filtration may not be used for Human consumption without further treatment steps to guarantee destruction of biological pathogens.

Portable reverse osmosis water processors are sold for personal water purification in the home. These units are gravity powered (they need no water pump), and need no electricity. The pressure of gravity pushes/drains the water though the filters, much like a coffee-maker filter. A filter lasts for about seven years before replacement is needed, although it may need to be replaced as often as every year, depending on usage and the condition of the water. Some travelers on long boating trips, fishing, island camping, or in countries where the local water supply is polluted or substandard, use reverse osmosis water processors. Reverse osmosis systems are also now extensively used by marine aquarium enthusiasts, as the domestic water supply contains substances that are extremely toxic to most species of saltwater fish. In production of bottled mineral water, the water passes through a reverse osmosis water processor to remove pollutants and microorganisms, including the smallest microbe known, archaeobacteria.

Evaluation of long-term reverse osmosis element performance involves consideration of more than salt rejection. Membrane flux, element flow capacity, system pressure requirements, membrane fouling rates, membrane response to cleaning operations and tolerance of cleaning procedures, and the durability of the element all can be important factors in choosing an element. Each can affect the overall productivity of a water treatment system and the capital and operating costs associated with it.

Unfortunately, pressure is needed to operate reverse osmosis. In the U.S. water systems, the water pressure in the pipes provides a sufficient pressure to undergo reverse osmosis. Gravity may also provide sufficient pressure in some cases. There is a serious need in developing countries, however, for a system of water purification that can produce large quantities of water (sufficient for a small village) where there is no power source available to produce the pressure necessary for typical reverse osmosis operation.

Hand pump-operated units for ultrafiltration and reverse osmosis are known, such as those made and sold by Katadyn. None of these, however, combine ultrafiltration and a reverse osmosis membrane unit in a system operated by a hand pump that produces water free of bacteria and substantially free of other contaminants (to bring the water within the IS standards) in amounts sufficient to supply more than a few people.

The manufacturers of reverse osmosis membranes sufficiently large for purification systems for a village water supply specifically limit the use of those filters to a pressure range of 200-800 psi (pounds per square inch), equivalent to approximately 14-56 bar. These pressures are unattainable using a hand pump.

SUMMARY

The objects include the ability to provide higher output water purification using lower pressure pumping sources. By "lower pressure" is meant water pressure no greater than can be generated by hand pumps common in third world countries, whether the pump is in fact a hand pump, an electric pump or other type of pump. We use a lower pressure pump, such as a hand pump, pumping a volume of water through an ultrafiltration filter and sequentially through a reverse osmosis membrane that passes purified water and separates rejected water. The rejected water is discharged from an outlet of the reverse osmosis membrane, while the purified water is pumped from a second water outlet.

BRIEF DESCRIPTION OF THE DRAWINGS

FIG. 3 is a schematic diagram of a water purification system of the present invention with an ultrafiltration unit and a single reverse osmosis filtration unit.

FIG. 4 is a schematic diagram of an alternative embodiment of a water purification system.

DETAILED DESCRIPTION

Figure 1:
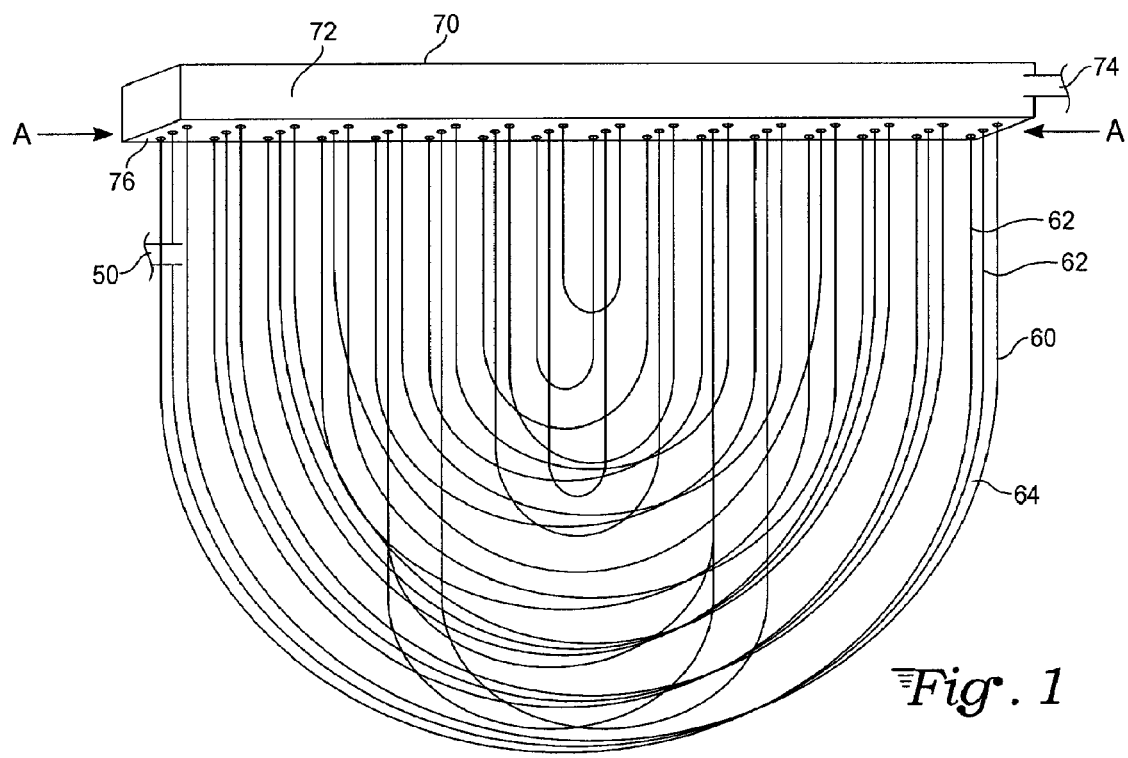
FIG. 1 is a cross-sectional view of an ultrafiltration filter cartridge for use in a water purification system of the present invention.
Figure 2:
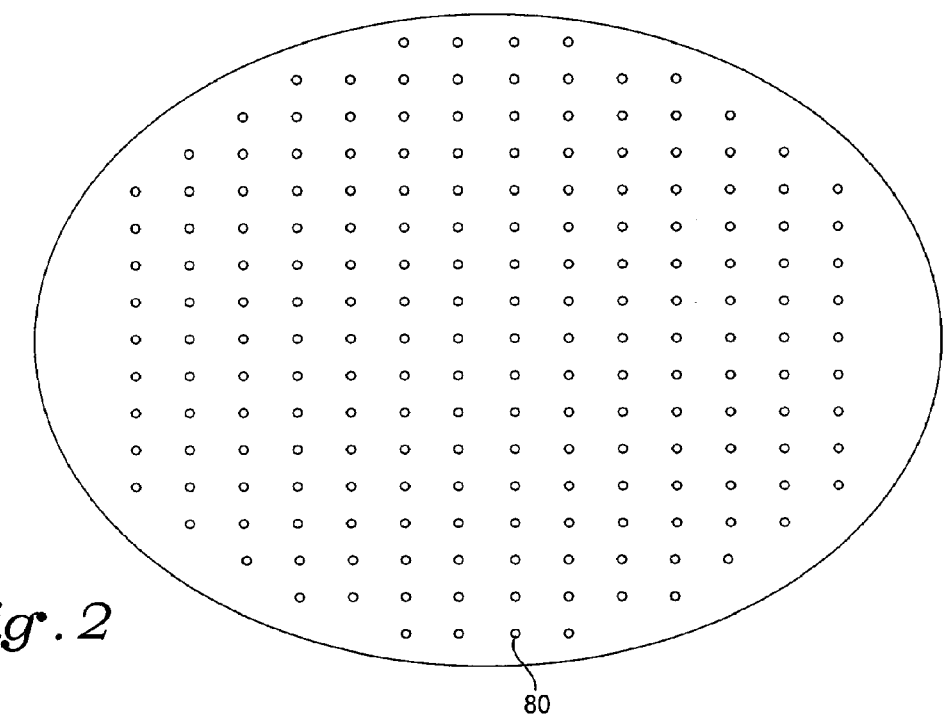
FIG. 2 is an exploded view of part of the filter cartridge shown in FIG. 1.

It is an object to provide a low pressure pump system for purifying water so that the system can be used with hand pumps and similar low pressure applications as might be derived from solar power or wind power. The low pressure pump establishes a volume that will pass through an ultrafiltration filter and a reverse osmosis unit. In one embodiment, a common third world type double acting reciprocating hand pump was used. Such pumps are designed such that, in a closed system (no water being released), pressures can reach up to 4 bar (about 60 psi), but are sometimes limited not to exceed higher pressures to prevent damage and leakage.

In one embodiment the pump is a modified version of model BS 1208 sold by Venus Pump & Engineering Works of India. The specifications of the pump are that the flow rate is 1300 liters per hour at about 90 strokes per minute. To retain the pressure in the pump up to 4 bar, a built-in check valve was provided inside the suction side of the pump body. In one embodiment, the pump is made of stainless steel, so as not to contaminate the drinking water after purification.

In one embodiment, a 1-inch capacity pump was used. In other, higher capacity embodiments, such as in FIG. 4 may be used, one may use the 1 inch capacity hand pump or, a 1.5 inch capacity pump, which may be operated at up to around 72 strokes per minute. It will be appreciated that, under some circumstances, a battery or solar powered pump may be used which generates pressures comparable to those generated by the hand pump in situations where power to operates pumps that generate higher pressure is in short supply or unavailable.

Referring now to FIG. 3, one embodiment of the invention is depicted. This drawing depicts the water flow order of the elements, though not their precise location. Water is provided to a raw water tank 13, by any means, typically a hand pump 14 with a reciprocating handle 10 that can be independent of the pump used to generate pressure in the system. Raw water has bacteria, particulates, foreign molecules and compounds, dirt, organisms, and is not suitable for drinking by humans. Optionally, an anti-sealant dosing tank 11 is provided, along with an anti-sealant dosing pump 21, which can be interlocked with the primary hand pump 14, indicated by dashed line L. Replacing hand pump 14 could be a solar electric pump or a wind driven electric pump, both producing pump pressure of less than 4 bars measured by a pressure gauge between the pump and a filtration cartridge.

Feeding the raw water tank 13 is an inlet hose 99 and an associated valve 98 for sustained water flow to hand pump 14. Optional pressure gauges 34, 36, 38, 40, are located throughout the system. Elements of the system are selected such that the hand pump can be operated to provide sufficient pressure to direct the pump's volume of water through the system. In one embodiment, the water next passes through valve 46 a preliminary cartridge filter 15 having a porosity of about 5 microns to remove relatively large contaminants from the water.

Preferably, the water then is pumped through valve 48 into ultrafiltration unit 16, described further below. The water then pass through valve 50 and reaches the reverse osmosis unit 17, at which point the pressure must be approximately 20-25 psi, preferably around 22.5 psi. An adjustable portion of the water (depending on what is referred to as the "recovery rate") is rejected from the reverse osmosis unit, through valve 52 and past flow meter 72 through the reject water outlet 90. The use of valve 52 in conjunction with pressure gauge 40 allows maintenance of the desired pressure, protective of the system. The remainder of the water, the "purified" portion, then optionally passes part flow meter 74 through an activated carbon filter 18 before it emerges past valve 54 to the fresh water outlet 92 as potable water.

When the system is closed (i.e., no water is being released), a pressure of up to 60 psi may be generated with the hand pump. When water is being released, the system operates at pressure of about 32-40 psi. Approximately 7 psi is lost at the 5 micron prefilter, and an additional 7 psi is lost during the ultrafiltration, so the pressure at the entrance to the reverse osmosis unit is approximately 20-25 psi. It is believed that a minimum pressure of approximately 20 psi must be present at the entrance to the reverse osmosis membrane. A human-powered hand pump cannot generate beyond about 25 psi, or the fatigue level is reached very quickly.

The ultrafiltration units used in the preferred embodiment are made from Ultra-Flo DUC 108 ultrafiltration membrane from Ultra-Flo PTE Ltd., 452 Tasgore Industrial Avenue, Singapore 787823. Initially, the system used ultrafiltration units capable of processing up to 15-20 liters water per hour. To reach the specification of the reverse osmosis membrane, with a feed of approximately 270 liters per hour, 15 to 20 ultrafiltration units were connected in parallel (i.e., the water flow was divided into 15-20 separate units for simultaneous processing) and then recombined into a single flow for entry into the reverse osmosis unit. Element 6 in FIG. 3, therefore, may be a combination of ultrafiltration units, or a single, larger capacity ultrafiltration unit. In an alternate preferred embodiment, a single ultrafiltration unit capable of greater than 600 liters per hour is used.

In the first working model of the invention based on the preferred embodiment of FIG. 3, the reverse osmosis unit was a Dow 4040 filter (4 inches diameter, 40 inches long). Operating parameters by the manufacturer are 225 psi (maximum pressure 600 ppm). Therefore, the operation of the present invention involves pressures substantially lower than those recommended, or even thought possible, with the commercial unit. The Dow 4040 is rated with a 99.5% average NaCl rejection, with a 99% minimum rejection. During operation at low pressure, however, the NaCl rejection percentage is expected to drop, but still be sufficient to provide potable water as defined by the IS standards.

In operation, the outlet valves from the reverse osmosis unit are set to an approximately 15% recovery rate, preferably approximately 15-20%, as recommended by the manufacturer. The recovery rate is the amount of "purified" water from the reverse osmosis unit as a percentage of the water introduced into the apparatus. Thus, about 85% of the feed water is lost as rejected water from the reverse osmosis unit. In practice, however, it is possible to exceed the manufacturer's suggested recovery rate and obtain an even larger amount of purified water without sacrificing reverse osmosis membrane lifespan because, even at the higher recovery rate, the pressure within the reverse osmosis membrane is still far below the pressure allowed by the specifications. If the recovery rate were greater than 15% when operated at 200-600 psi in accordance with the manufacturer's specification, the reverse osmosis unit would be more susceptible to damage, and would have a greatly decreased expected lifespan. Therefore, according to the invention, the recovery rate is preferably 15-20%, alternatively 15-50%, alternatively 20-40%, and alternatively 25-35%. Preferred alternative recovery rates are approximately 20%, approximately 25%, approximately 30%, approximately 35%, approximately 40%, approximately 45%, and approximately 50%.

Using the 4040 reverse osmosis unit, the typical feed rate of water was approximately 270 liters per hour, although the feed rate could reach 350 liters per hour. Using the same apparatus design as in FIG. 3 but with an 8040 reverse osmosis membrane unit (8 inch diameter), the maximum flow rate is expected to be approximately 600-700 liters per hour, preferably 667 liters per hour. This allows processing of up to approximately 100 liters of purified water per hour with a single reverse osmosis membrane.

FIG. 4 shows another preferred embodiment of the invention using multiple reverse osmosis membrane units. To process more water, up to three 8040 reverse osmosis units 201, 202, and 203 are connected in series, wherein the waste water from the first reverse osmosis unit is used as the feedwater for the second reverse osmosis unit, and the waste from the second reverse osmosis unit is used as the feedwater for the third reverse osmosis unit. Three reverse osmosis units may be joined in series; using more than three units would require more pressure than could be produced by a hand pump.

EXAMPLES

Example 1

Operating the system described in FIG. 3, with a reverse osmosis unit DOW 4040, coupled with Ultra-Flow ultrafiltration filters, with a prefilter of 5 microns, an initial pressure of 4 bar (approximately 60 psi) was obtained with the system closed (no water exiting the system).

With the water outlets open, a flow or feed rate of 270 liters water per hour was achieved, with an outlet rate of approximately 40 liters per hour purified water.

Example 2

Using the same conditions as in EXAMPLE 1, beginning with raw water with a TDS of 75 ppm, purified water was obtained with a TDS of 4 ppm.

Example 3

Using the same conditions as in EXAMPLE 1, beginning with raw water with a TDS of 1230 ppm (using added NaCl), purified water was obtained with a TDS of 15 ppm. Using a recovery rate of 20%, a flow rate of only 5 liters per hour was obtained. Preferably, the water to be purified using the invention will have an initial TDS of approximately 600-1000 ppm to allow sufficient flow rate to be practical, though purification of water with higher TDS is possible.

Example 4

Using the same conditions as in EXAMPLE 1, beginning with raw water fluoride concentration of 6.8 ppm, purified water was obtained with a fluoride concentration of 1.6 ppm. Greater than 75% of the fluoride was removed.

What is claimed is:

1. An apparatus for the production of potable water comprising:
    a water pump capable of providing a pump pressure of 4 bars (60 psi) and a flow volume of at least 250 L/hr of raw water;
    a plurality of ultra filtration units connected in parallel to said water pump having a combined surface area that is effective to urge a filterable flow volume through said ultra filtration units with a pressure loss of at most 7 psi;
    at least one reverse osmosis unit connected to receive filtered water of the flow volume coming through said ultra filtration cartridge the at least one reverse osmosis unit having a capacity sufficient to allow a first portion of at least 15 percent of the received water to pass through said reverse osmosis unit as purified water with total dissolved solids less than 500 ppm and a second portion of the received water to be separated out as rejected water;
    a first water outlet connected to said reverse osmosis unit for receiving the purified water at a rate of at least 40 L/hr; and
    a second outlet connected to an inlet to said reverse osmosis unit for removal of the rejected water.

2. The apparatus of claim 1 wherein said pump has means for maintaining water pressure at a pumped pressure no greater than can be established by a hand pump.

3. The apparatus of claim 2 wherein said water pump is an electric pump.

4. The apparatus of claim 2 wherein said water pump is a hand pump.

5. The apparatus of claim 1, further including an anti-scalant dosing tank upstream of said pump.

6. The apparatus of claim 1 wherein said at least one reverse osmosis unit includes a first and a second reverse osmosis unit connected in series, both reverse osmosis units having input pressures in excess of 20 psi.

7. The apparatus of claim 1 wherein said water pump has an intake rate of from about 250 liters per hour to about 350 liters per hour.

8. The apparatus of claim 1 wherein said apparatus has a potable water production capacity of up to 300 liters per hour.

9. The apparatus of claim 1 wherein the recovery rate of purified water is from about 15% to about 50%.

10. The apparatus of claim 1, further including an anti-scalant dosing pump.

11. The apparatus of claim 1 further comprising at least one pressure gauge configured to detect and display water pressure entering said at least one reverse osmosis unit.

12. The apparatus of claim 1 further comprising at least one preliminary cartridge filter with a pore size of about 5 microns.

13. The apparatus of claim 1 further comprising at least one activated charcoal filter configured such that water is pumped through said activated charcoal filter after leaving said ultra filtration units.

* * * * *